(No Model.)
W. LINDENMANN.
DEVICE FOR TAPPING BARRELS.
No. 454,749. Patented June 23, 1891.
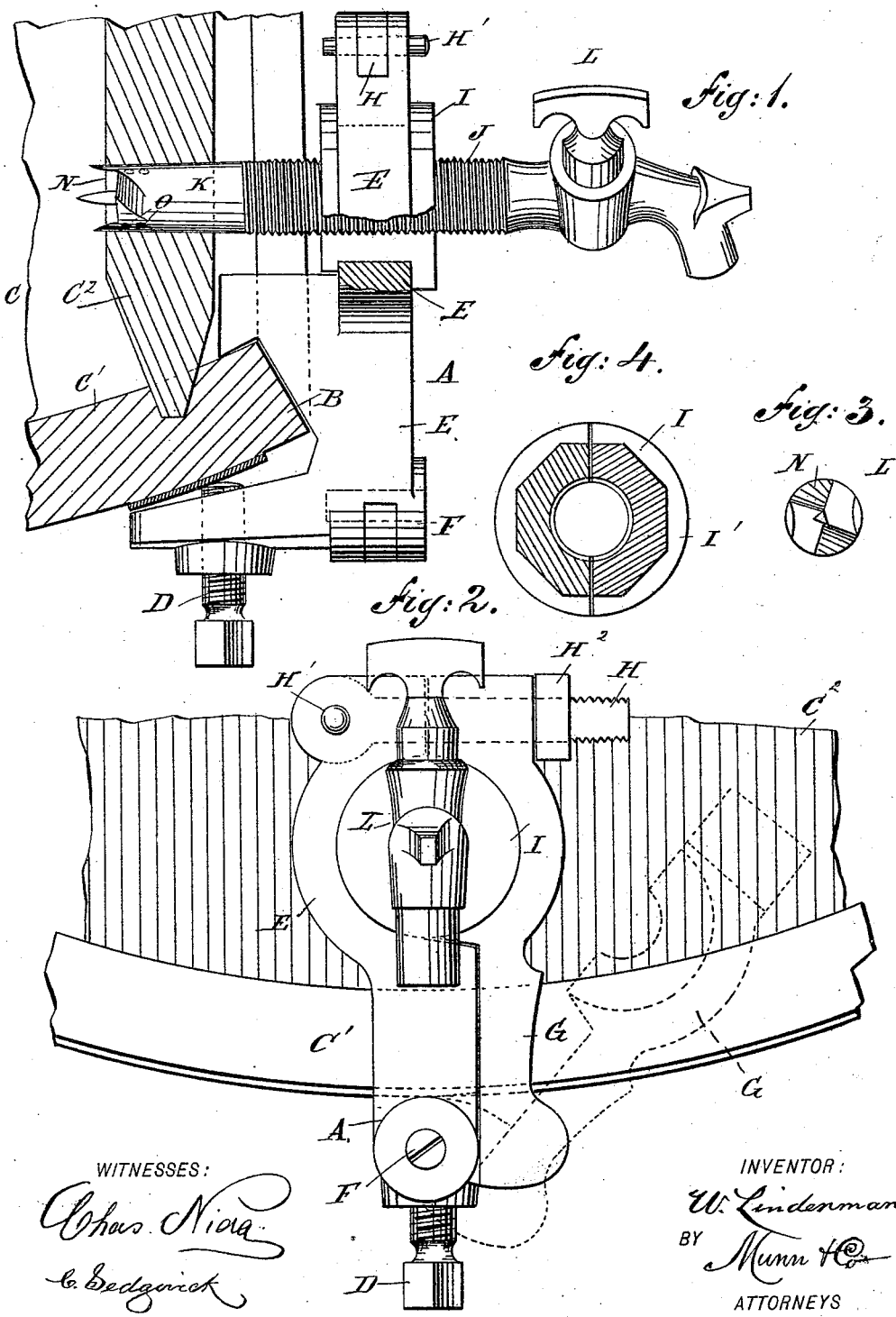

UNITED STATES PATENT OFFICE.

WILLIAM LINDENMANN, OF NEW BRUNSWICK, NEW JERSEY.

DEVICE FOR TAPPING BARRELS.

SPECIFICATION forming part of Letters Patent No. 454,749, dated June 23, 1891.

Application filed February 20, 1891. Serial No. 382,137. (No model.)

*To all whom it may concern:*

Be it known that I, WILLIAM LINDENMANN, of New Brunswick, in the county of Middlesex and State of New Jersey, have invented a new and Improved Device for Tapping Barrels, of which the following is a full, clear, and exact description.

The object of the invention is to provide a new and improved device for tapping barrels which is simple and durable in construction and designed to form its own opening into the barrel at any desired place to conveniently draw off the contents of the barrel whenever desired.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement as applied, parts being in section. Fig. 2 is a front view of the same. Fig. 3 is a face view of the auger, and Fig. 4 is a sectional side elevation of the sectional nut.

The improved device for tapping barrels is provided with a frame A, adapted to be secured to the barrel and provided for this purpose with an angular recess B, adapted to engage one of the staves $C'$ of the barrel C on the outside of the head $C^2$. (See Figs. 1 and 2.) A set-screw D screws in an arm on the frame A and abuts against the outside of the stave $C'$, so as to securely fasten the frame A to the barrel C. On the frame A is formed an arm E, extending in front of the head of the barrel and carrying a pivot-pin F, on which is pivoted a second arm G, adapted to close onto the arm E and adapted to be fastened thereto by means of a bolt H, pivoted at $H'$ to the outer end of the arm E and passing through slots in the ends of the said arms E and G, as is plainly shown in Fig. 2. A nut $H^2$ screws on the bolt H and is adapted to abut against one side of the arm G, so as to securely clamp or fasten the latter onto the fixed arm E. The two arms E and G are adapted to support and hold in place a nut I, preferably made sectional, as is plainly shown in Fig. 4, and made on its outside in a polygonal shape fitting into correspondingly-shaped recesses in the arms E and G, so as to prevent the nut from turning. On the ends of the nut are formed flanges $I'$, engaging the front and rear faces of the arms E and G. The nut is adapted to be engaged by a screw-thread J, formed exteriorly on the shank K of a faucet L, having its rear ends slightly tapering and formed at the extreme rear end with an auger N, adapted to screw into the head of the barrel, so as to form an opening therein. The openings O are formed in the shank in its periphery in the rear of the auger N, so that when the latter has passed through the head of the barrel into the interior of the latter the said openings O establish a communication between the interior of the barrel and the bore in the shank K of the faucet L. The latter is provided with the usual valve and outlet, as shown.

The device is used as follows: The frame A is clamped onto the barrel, as shown and described. The arm G is then opened by swinging the bolt H outward out of engagement with the arm E and then inserting into the said arms the sectional nut I, after which the arm G is closed and locked to the arm E by the bolt H engaging the forked end of the arm G and having its nut $H^2$ screwing down upon the said arm. The nut I inserted has a thread corresponding to the size of the thread J on the shank K, so that the faucet L is now screwed into the nut I, whereby the auger N finally comes in contact with the head $C^2$ of the barrel and bores an opening therein, so as to finally establish communication between the bore of the shank and the interior of the barrel, as previously described. By opening the valve of the faucet the contents of the barrel can then be withdrawn. By making the nut I sectional different sizes of nuts can be employed in the arms E and G for different-sized faucets.

It will be seen that this device is very simple and durable in construction, and can be readily adapted to the barrel so as to tap the same at any desired place.

Having thus fully described my invention, I claim as new and desire to secure by Letters Patent—

1. In a device for tapping barrels, the combination, with a frame having an angular recess, and a set-screw for attaching the frame to a barrel, of a fixed arm held on the said frame, a second arm pivoted on the said first-named fixed arm, a nut held between the said arms, and a faucet formed on its shank with screw-threads engaging the said nut, the inner end of the said faucet being formed with peripheral openings, and an auger, substantially as shown and described.

2. In a device for tapping barrels, the combination, with a frame having an angular recess, and a set-screw for attaching the frame to a barrel, of a fixed arm held on the said frame, a second arm pivoted on the said first-named fixed arm, a nut held between the said arms, a faucet formed on its shank with screw-threads engaging the said nut, the inner end of the said faucet being formed with peripheral openings, and an auger, and means, substantially as described, for fastening the said pivoted arm onto the said fixed arm, as set forth.

3. In a device for tapping barrels, the combination, with a frame provided with an angular recess, and a set-screw for attaching the said frame to a barrel, of a fixed arm projecting from the said frame, a second arm pivoted on the said fixed arm and adapted to be secured thereto, a nut having an exterior polygonal shape fitted into corresponding recesses in the said two arms, a faucet provided on its shank with an exterior screw-thread adapted to engage the said nut, the said shank being also formed near its inner end with peripheral openings, and an auger formed on the extreme inner end of the shank of the faucet, substantially as shown and described.

WILLIAM LINDENMANN.

Witnesses:
   FELIX ARNOULT,
   FREDERICK WEIGEL.